United States Patent [19]
Smith et al.

[11] 3,736,583
[45] May 29, 1973

[54] APPARATUS FOR DETECTING THE PRESENCE OF HARD SOLID PARTICLES IN A BODY OF SOFTER SOLID SUBSTANCE

[75] Inventors: Richard A. Smith, Gibsonia; Elmer E. Harris, Glenshaw, both of Pa.

[73] Assignee: H. J. Heinz Company, Pittsburgh, Pa.

[22] Filed: Jan. 13, 1971

[21] Appl. No.: 106,043

[52] U.S. Cl..........................340/240, 17/25, 33/1 H, 33/175, 73/81
[51] Int. Cl..............................................G08b 21/00
[58] Field of Search......................340/240, 282, 421; 73/81–85, 64, 78, 104, 105; 33/1 H, 174 PA, 175

[56] References Cited
UNITED STATES PATENTS

| | | | |
|---|---|---|---|
| 2,378,039 | 6/1945 | Schenker | 33/175 X |
| 2,445,731 | 7/1948 | Jaycox | 73/81 X |
| 2,699,540 | 1/1955 | Hunter | 340/282 |
| 3,470,739 | 10/1969 | Takafuji et al | 73/105 X |
| 3,534,477 | 10/1970 | Nahas | 33/1 H |
| 110,111 | 12/1870 | Bringman | 17/25 |
| 2,045,176 | 6/1936 | Bush | 73/78 UX |
| 3,256,801 | 6/1966 | Greenspan | 17/25 X |
| 3,535,734 | 10/1970 | Ross | 17/25 |

Primary Examiner—John W. Caldwell
Assistant Examiner—Daniel Myer
Attorney—Parmelee, Utzler & Welsh

[57] ABSTRACT

Apparatus for detecting the presence of hard solid particles in a body of softer solid substance, such as the presence of bone fragments in chicken flesh, is disclosed. The apparatus includes a probing unit having a matrix of uniformly spaced probes slidably received in a plate. Above the plate is a chamber into which is supplied pressurized fluid which acts to urge each probe downwardly against the plate with equal pressure. Means are provided for driving the probing unit downwardly to force the probes through the solid substance to be examined. An electrical conductor plate is arranged over all of the upper terminal portions of the probes for sensing the upward movement of the probes when the fluid pressure is insufficient to restrain the probe against such upward movement. Upward movement of any of the probes will result when a hard object is encountered. A signal means is activated to indicate the presence of a hard particle when any of the terminal portions of the probes contacts the conductor plate.

11 Claims, 5 Drawing Figures

INVENTORS.
RICHARD A. SMITH &
ELMER E. HARRIS
Attorneys

Patented May 29, 1973

INVENTORS.
RICHARD A. SMITH &
ELMER E. HARRIS
By Parmelee, Utzler & Welsh
Attorneys INVENTORS.
RICHARD A. SMITH &
ELMER E. HARRIS
By Parmelee, Utyler & Welsh
Attorneys

APPARATUS FOR DETECTING THE PRESENCE OF HARD SOLID PARTICLES IN A BODY OF SOFTER SOLID SUBSTANCE

BACKGROUND OF THE INVENTION

1. Field of Invention

This invention relates to apparatus for detecting the presence of hard solid particles or objects in a body of softer solid substance, such as the presence of bone, gristle, or cartilage fragments in chicken flesh, for example.

2. Description of the Prior Art

In many processes there is a need for removing small hard solid particles from a body of softer solid material. In the food processing industry, for example, one such need is the removal of small bone fragments and other hard matter such as gristle and cartilage from chicken. The usual procedure followed in removing the hard matter is to first have sorters or inspectors inspect chicken pieces by feeling with their fingers and then to remove any detected particles. This method has proven to be greatly inadequate, especially in detecting and removing very small (viz. ⅛ inch) particles. Oftentimes many small bone fragments remain in the chicken end up in the final product. The consumer then encounters the undetected fragments. Being constantly concerned with maintaining good customer relations the processors take all precautions against the failure to detect and remove all bone fragments from the chicken. The normal precaution is to establish careful inspection techniques for the inspectors to follow. However, this precaution has not solved the problem since it is virtually impossible for an inspector on a production line to detect all of the smaller bone fragments. In addition, the problem is increased because of the brittleness of the bones of chickens and the tendency of the bones to fragmentize into small pieces when the chickens are being processed.

SUMMARY OF THE INVENTION

This invention overcomes those problems mentioned above by providing an apparatus which has the capability of penetrating the soft solid material of a body and detecting any small hard fragments present therein. More particularly the penetration apparatus of this invention preferably comprises a probing unit including a matrix with a plurality of spaced holes passing therethrough; a plurality of elongated probe members one each being slidably fitted in each hole of the matrix, each probe having an upper terminal portion above the matrix and a needle portion projecting below the matrix; pressure means operative with the terminal portions of the probes for supplying and maintaining pressure on each of the probes whereby each individual probe member is urged downwardly independently of the others; and drive means for effecting relative vertical movement between the probing unit and the solid substance to be examined to force the needle portions of the probes through the solid substance. When a probe encounters a bone fragment it will be caused to move upwardly relative to the rest of the probes. In our preferred form of this invention, the upwardly moving probe contacts an electrically conductive plate disposed above the probes. When the plate is contacted a signal is activated for indicating that a fragment has been detected. Also in the preferred form of this invention means are provided for instantly reversing the direction of the relative travel between the probing unit and the surface upon which the test piece is placed when a fragment is detected. The preferred form also provides a chamber above the matrix into which pressurized fluid is directed to urge the probes downwardly. The magnitude of pressure acting on the probes may be selectively set for adjusting the sensitivity of the probes. Thus, a lower fluid pressure would be used for detecting such things as bones, veins, gristle, or cartilage in meats, while a higher pressure would be used for detecting bones only. Such sensitivity and versatility is achieved by making the probes individually movable, rather than having them all fixed with respect to the matrix.

By spacing the probes the smallest fragment size to be detected is established. For example, with the spacing of the centers of the needle portions of the probes at one-eighth of an inch particles sizes about one-eighth inch across or larger could be detected. Smaller size particles would usually be detected by the probes although some might be missed by lodging between probes. The incidence of failure to detect the smaller particles would be increased by a probe pattern having distinct rows of probes. Detecting of smaller particles would be insured by placing the probes in a pattern which would avoid establishing rows of needles whereby the small particles could lodge between the rows and go undetected. A spiral pattern of probes would avoid such undetecting since there would be no rows of needles.

Other details and advantages of this invention will become apparent as the following description of a present preferred embodiment thereof proceeds.

In the accompanying drawings we have shown a present preferred embodiment of this invention in which:

DESCRIPTION OF PREFERRED EMBODIMENT

Figure 1:
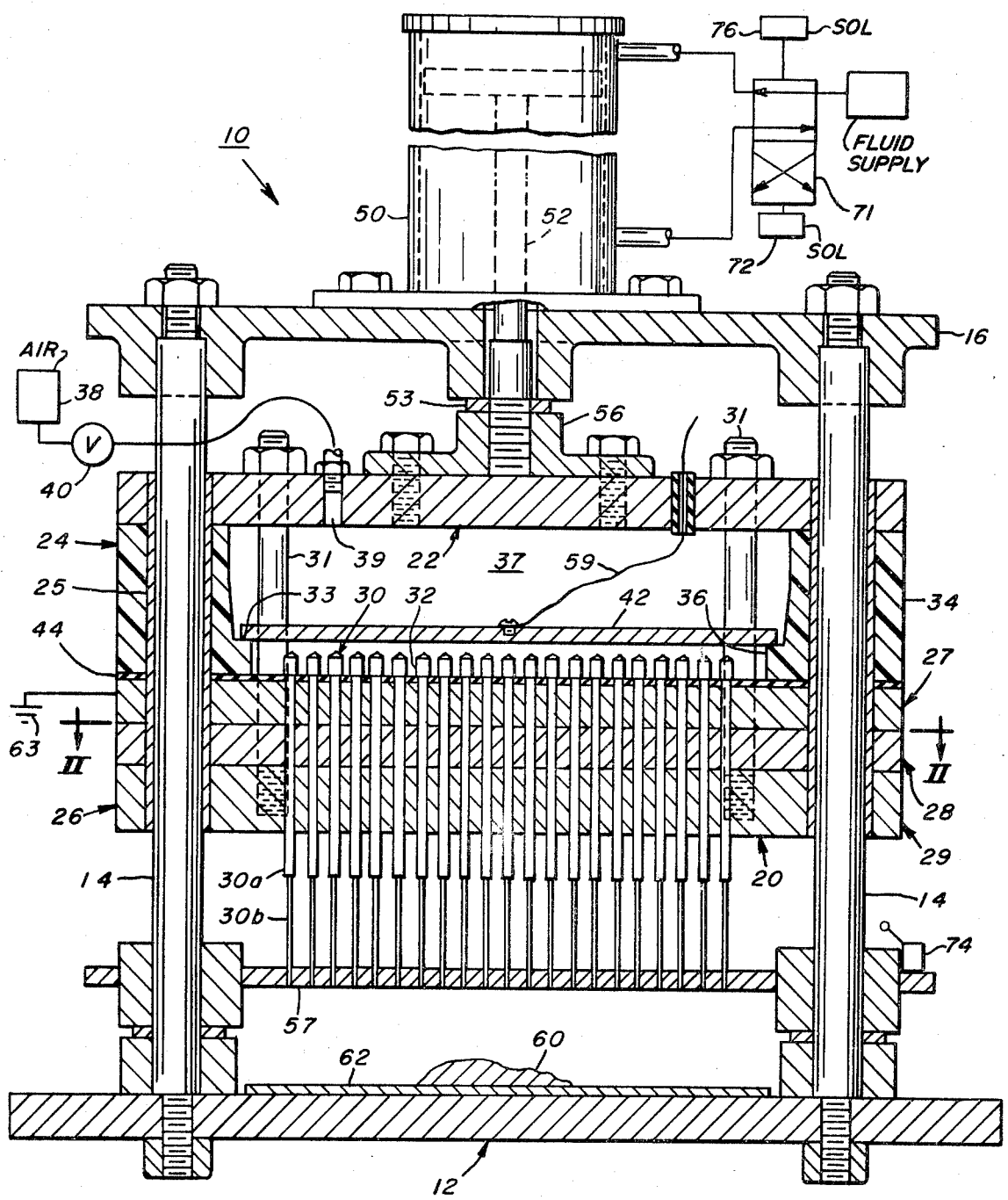
FIG. 1 is an elevation view of a penetration apparatus embodying the present invention, showing the probing unit in its upper position.

Referring now to the drawings, 10 generally represents a penetration apparatus embodying this invention. Penetration apparatus 10 includes a disc-shaped base plate 12 to which is secured four vertically extending support rods 14 arranged in a generally square pattern. The upper ends of the support rods 14 are secured to a disc-shaped plate 16.

A probing unit 20 is arranged for reciprocal vertical movement with respect to the support rods 14. Probing unit 20 includes an upper cover plate 22, a housing 24 disposed in abuttment with the lower surface of plate 22, and a probe assembly 26 arranged in abuttment with the lower surface of housing 24. Plate 22, housing 24, and probe assembly 26 are all provided with communicating similarly spaced and sized openings to be registered with bushings 25 fixed to cover plate 22, housing 24, and probe assembly 26, which bushings are slidably arranged in support rods 14.

Figure 2:
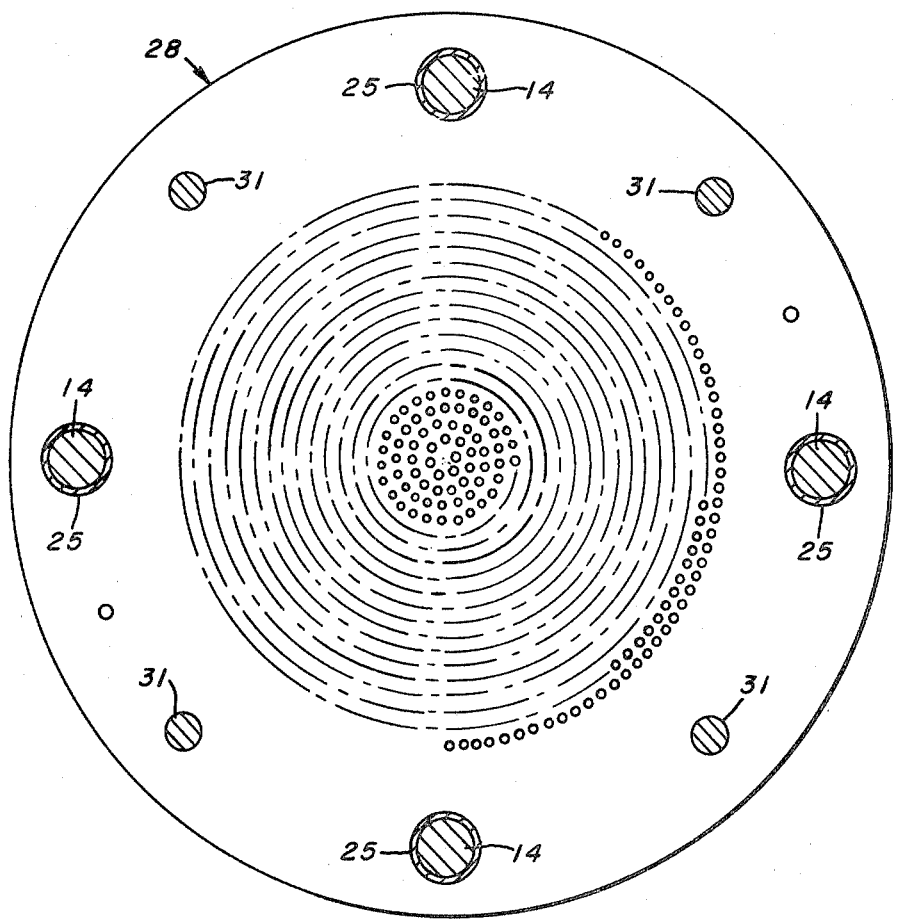
FIG. 2 is a view taken along the line II—II of FIG. 1.
Figure 5:
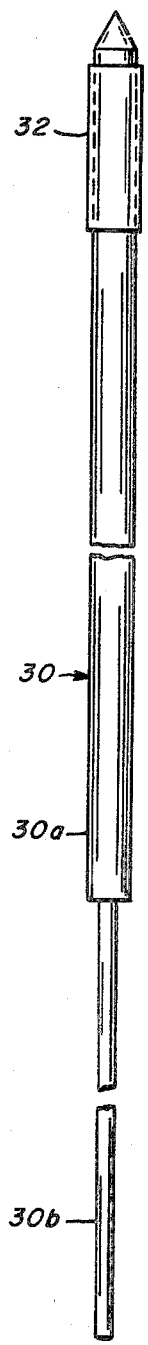
FIG. 5 is an enlarged view of one needle forming part of the present invention.
Figure 3:
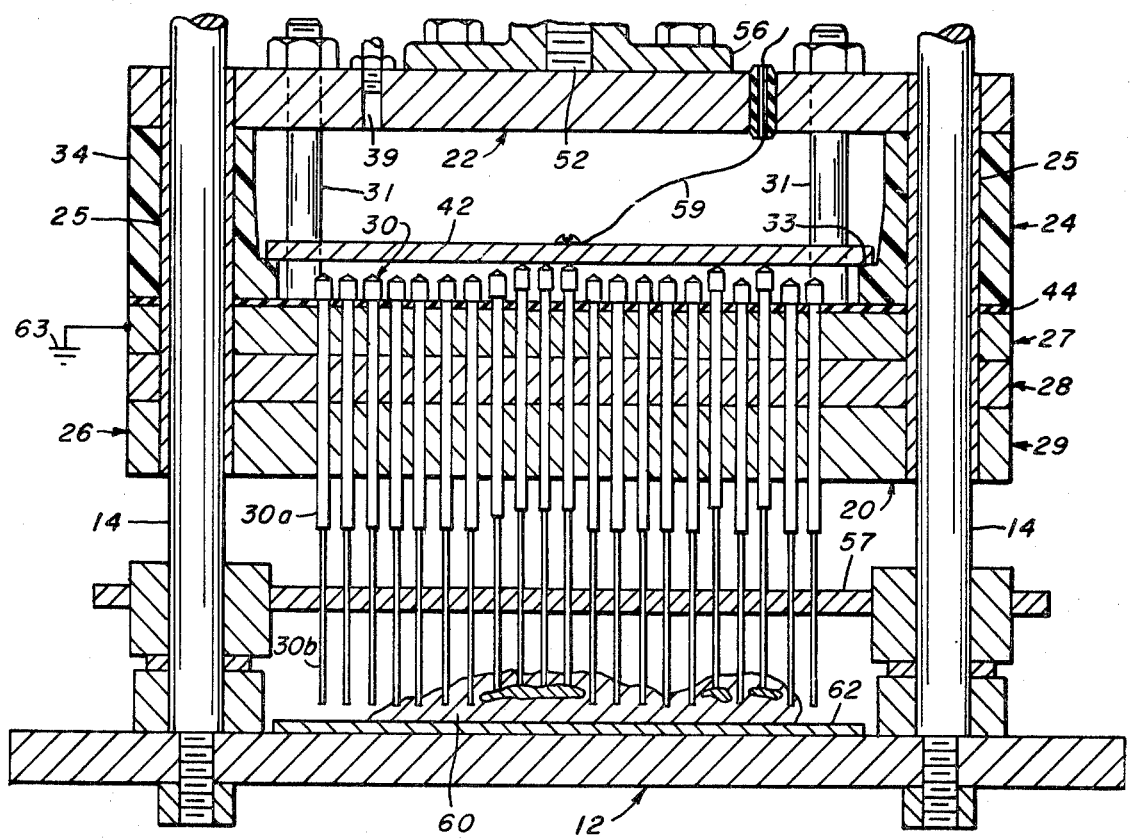
FIG. 3 is an elevation view similar to that of FIG. 1 showing the probing unit in a lower position with the probes penetrating a piece of soft solid substance with some of the probes encountering hard particles.

Probe assembly 26 includes three electrically conductive abutting plates 27, 28, and 29 secured to each other by four bolts 31 in the manner shown in FIGS. 1 and 2 and having communicating, closely-spaced axial holes therethrough, the holes being arranged in a spiral pattern as shown in FIG. 2. The three plates 27, 28, and 29 provide a housing or matrix for receiving penetrating rod-shaped probes 30. It is noted at this point that three plates 27, 28, and 29 are provided merely for ease in drilling the many closely spaced holes (viz. approximately 1100 holes at around 3/32 inch diameter). One or more solid plates could be used and would serve the same function. Each probe 30 includes an upper terminal portion 30a having an outer diameter slightly smaller than the diameter of the holes through the plates 27, 28, and 29, whereby the probes are slidable with respect to the plates. The lower portion of each probe 30 is a slender needle 30b having, preferably, a generally flat bottom end with a rounded edge as clearly shown in FIG 5. The lengths of the needle portions 30b are generally uniform whereby their free lower ends are in substantially the same horizontal plane.

Each probe 30 is provided with a cylindrical sleeve 32 fixed around an intermediate section of the terminal portion 30a and disposed to have its lower end abut the upper surface of a sealing gasket 44 secured to the top plate 27. The sleeve 32 serves as a stop to limit the relative downward movement of the probe 30 with respect to the plates 27, 28, and 29.

The housing 24 is generally cylindrically shaped and formed from a transparent electrically insulating material, such as a suitable plastic for example. Housing 24 has an upper portion 34 and a reduced inner diameter lower portion 36 having a smaller inner diameter than that of the upper portions whereby an annular shoulder 33 is defined between the lower and upper portions. The horizontal plane of shoulder 33 is spaced very closely (vix. around 1/32 inch) from the upper ends of the terminal portions of the probes 30. A solid, electrically conductive plate 42 rests on shoulder 33 and serves as the sensing element for the upward movement of the probes 30, as will be more fully explained hereinafter. The sealing gasket 44 is secured by bolts 31 to the upper plate 27 of probing assembly 26 and includes a pattern of holes identical with the pattern of holes through the plates 27, 28 and 29. The terminal portions 30a of the probes 30 are engaged by the gasket 44 and the sleeves 32 seat on the gasket to thereby seal the chamber 37 against leakage of pressurized fluid therefrom. The interior of housing 24, the lower surface of cover plate 22, and the upper surface of plate 27 and gasket 44 together define a pressure chamber 37 into which pressurized fluid, such as filtered air, is supplied from a suitable source 38 through a pressure regulating valve 40 and then through opening 39 in cover plate 22. The pressure regulating valve 40 is of any well known type for maintaining a desired pressure in chamber 37.

A double acting hydraulic cylinder 50 is provided for effecting the downward and upward movement of probing unit 20. The rod 52 of the cylinder 50 is threaded into mounting fixture 56 and locked in place by lock nut 53. The mounting fixture 56 is suitably bolted to the upper surface of cover plate 22. By extending rod 52 the probing unit 20 will be urged downwardly toward base plate 12 where the needle portions 30b of probes 30 will pass through a suitably perforated stripper plate 57 mounted on support rods 14 to encounter a soft solid substance, such as, chicken flesh 60, disposed on platen 62 fixed to the upper surface of base plate 12. With chamber 37 being under fluid pressure sufficient to subject each probe 30 to a large enough force level for overcoming the resistance of the chicken flesh, the needle portions 30b will penetrate through the flesh. If the needle portions 30b do not encounter any bone fragments, the needle portions 30b will reach a horizontal plane adjacent to the upper surface of platen 62. Reversing the direction of movement of the piston of cylinder 50, the probing unit 20 will move upwardly to withdraw the needle portions 30b from the chicken flesh 60. The stripper plate 57 insures against the chicken flesh being carried upwardly with the probes 30.

The conductor plate 42 rests on shoulder 33 and may be moved upwardly under the urging of any of the probes 30. This arrangement of the conductor plate 42 insures against damage to the probes 30 in the event that any of the probes are forced upwardly against the conductor plate 42 by a large solid object, for example. As will be described hereinafter, safety features may be provided where the direction of movement of the probing unit 20 will be reversed when a solid object is encountered by any probe 30. If, however, a failure occurs in the reversing circuit, damage to the probes 30 will be avoided because of the 37 free floating" arrangement of the conductor plate 42.

In the event a needle portion 30b of a probe 30 encounters a bone fragment in the chicken flesh 60, the probe 30 will cease penetration and be urged upwardly whereby the upper or free end of the terminal portion 30a of that probe will contact the conductor plate 42. Conductor plate 42 forms that part of a control circuit and is wired into that circuit by wire 59 fixed to the plate 42 and extending through chamber 37 and outwardly through an insulating pressure seal 61 fixed in cover plate 22. The plates 27, 28, and 29 together with probes 30, all being electrically conductive, also form part of that same control circuit. The plates 27, 28, and 29, and the probes 30 are suitably grounded as indicated at 63. Whenever a probe 30 moves upwardly to contact conductor plate 42, the circuit will close and a signal would be actuated to indicate that a bone or other hard particle is in the chicken. That piece of chicken will then be passed on to a work station where the bone particle will be removed. A description of one typical control circuit follows.

Figure 4:
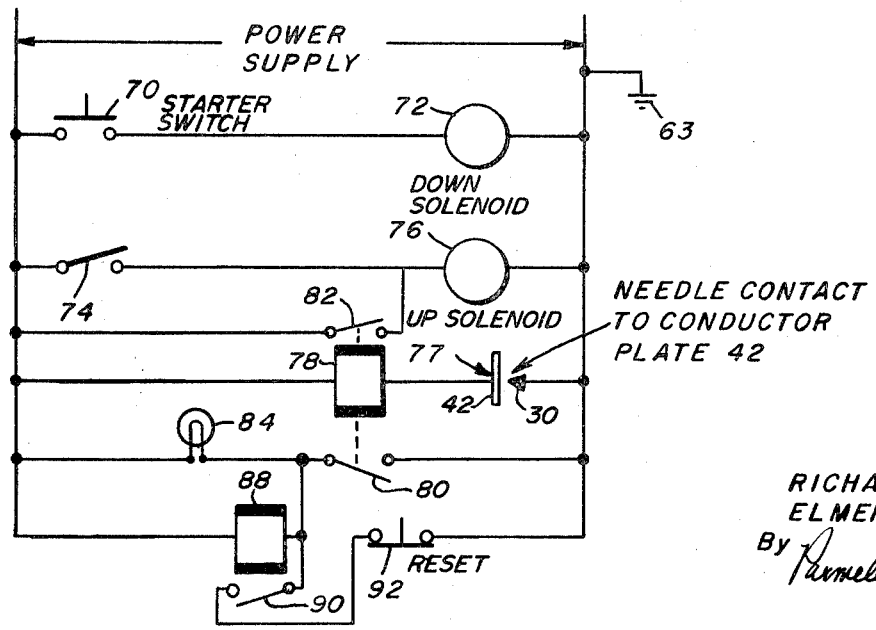
FIG. 4 is a schematic representation of a control circuit for operating the penetration apparatus of this invention.

FIG. 4 shows a schematic representation of one control circuit for use with the penetration apparatus of this invention. Beginning operation with the probing unit 20 in the upper position of FIG. 1, starter switch 70 is closed which activates solenoid 72 of four-way solenoid valve 71 to allow pressurized fluid to enter cylinder 50 as symbolically shown by the position of solenoid valve 71 in FIG. 1 to thereby extend rod 52 to urge the probing unit 20 downwardly. The needle portions 30b will penetrate the chicken flesh 60 and, if no bone fragments are present, switch 74 will be activated to activate solenoid 76 of solenoid valve 71 to reverse the flow of pressurized fluid in cylinder 50 and thereby retract the rod 52 and move probing unit 20 upwardly. In the event that a bone fragment is encountered by a needle portion 30b, the free end of upper terminal portion 30a will contact conductor plate 42 which is wired into the control circuit in the manner previously described while the probes 30 are grounded at 63 through the plates 27, 28, and 29. The relationshp of all the probes 30 to conductor plate 42 is represented on the schematic drawing by contacts 77. When a probe 30 contacts conductor or plate 42, relay 78 will be energized and contacts 80 and 82 will close wehreby signal light 84 will light and solenoid 76 of solenoid valve 71 will be actuated to reverse the flow of pressurized fluid in cylinder 50 and thereby retract rod 52 to move the probing unit 20 upwardly. When probing unit 20 begins to lift, the contact between the probes 30 and conductor plate 42 is opened (i.e. contact 77 opens) to de-energize relay 78 to open contacts 80 and 82. Relay 88 will also be energized to close contact 90. The circuit is reset after the bone fragment containing chicken piece is removed by opening reset switch 92 which causes relay 88 to de-energize, opening contact 90 and turning off signal light 84. Another cycle may be then started by closing switch 70.

The fluid pressure applied to the probes 30 should be sufficient enough to allow the needle portions 30b to penetrate the substance being examined. For example, cooked chicken flesh about ½ inch thick, will offer a resistance of anywhere from two to ten ounces of force to a needle of around 0.035 inches in diameter. To penetrate chicken flesh then, each probe should have about 15 ounces of force acting on it. Thus, the fluid pressure must be of a magnitude such that when acting on the area of the terminal portions 30a of the probes, a force level of around 15 ounces acts on the probe. With the diameter of the terminal portions being around three thirty-seconds inch a fluid pressure of around 120 psig. will provide a force level of around fifteen ounces. Bone fragments in the chicken will resist the probes with a force of around twenty ounces and above, to thereby cause the probes to be urged upwardly against conductor plate 42. When it is desired to sense particles which are softer than bone, such as veins, gristle, or cartilage the fliud pressure would be decreased to decrease the penetration force of the probes. The softer particles, offering less resistance than bone, will cause the probes to retract to contact conductor plate 42 since the penetration force of the probes is decreased.

It was earlier noted that free ends of the needle portions 30b of the probes 30 should preferably be flat with a rounded edge. It has been found that such a shape is best for detecting hard particles in chicken for example, will preventing the tearing of the flesh. The flat end offers the best resistance against penetrating boen particles as compared to a pointed end which could penetrate a bone and thus not cause the probe to retract to contact the conductor plate 42. It is also undesireable to have the end of the needle portion sheared straight since this shape would tend to punch a hole in the meat flesh and could also penetrate a bone fragment. Although the flat, rounded edge shape for the end of the needles is the preferable shape, a hemispherical end would also be acceptable.

The length of the needle portions 30b of each probe 30 should be such that the end of the needle will reach a point close (viz. about one sixty-fourth of an inch) to the top surface of platen 62 when the probing unit 20 is moved to its lowermost position. By so sizing the length of the needle portion, it will be insured that substantially the entire thickness of the substance to be examined is penetrated.

As was earlier described, the horizontal plane of shoulder 33 is spaced very closely from the upper ends of the terminal portions of the probes 30. Such a horizontal plane establishes the distance of the upper ends of the probes 30 from the lower surface of the conductor plate 42. It is noted that the selected spacing between the upper ends of the probes 30 and the conductor plate 42 may be made on the basis of the minimum thickness of solid particle sought to be detected. Thus, if the minimum particle thickness is one sixty-fourth inch, for example, the spacing should be slightly less than one sixty-fourth inch.

To assure that needle portions 30b will not break off and remain in the substance being examined, the material selected for the needles should be either strong enough to resist any breaking stresses, such as would occur when a hard particle deflects a needle, or plastic enough to distort when encountering a breaking stress. Breaking stresses should, however, not be set up because of the "free floating" arrangement of conductor plate 42 or if the probing unit 27 is retracted upwardly the instant a probe 30 is caused to contact conductor plate 42 when a needle encounters a hard particle.

The probing unit 20 was described as being reciprocally movable with respect to platen 62. It should be noted, however, that the probing unit 20 could be made stationary and the platen 62 made reciprocally movable. Also, the platen 62 could be eliminated and the entire apparatus 10 arranged over a conveyor or table upon which the test pieces would be positioned and the probing unit 20 made to reciporcate towards and away from the test pieces, or the support surface for the test piece made to reciprocate towards and away from a staionary probing unit 20.

The penetration apparatus of this invention provides means for accurately detecting practically all hard particles in a body of softer solid substance by providing independently controlled probes for penetrating the body. This enables each probe to be considerably more sensitive to detecting hard particles as compared to a fixed group of probes penetrating the body. By virtue of the sensitivity possible with this invention, very small hard particles will be detected, with the limit of the minimum size particle being determined by the spacing of the needles and the relative position of the particles to the needles. In contrast to this capability, a fixed probe device would not be able to be made sensitive enough to detect very small (viz. one-sixteenth to ⅛ inch thick) particles.

It is also noted that the probes 30 could be arranged so that each is subjected to a pressure transmitted by mechanical means such as spring loaded pistons, for example. Fluid pressure, however, applied in the manner described is preferable. In the foregoing description reference was made to apparatus of this invention as being used for detecting hard fragments in cooked chicken flesh. It is to be clearly understood that the reference to cooked chicken flesh was merely for purposes of example and is not to be construed as limiting the invention to use with chicken. The apparatus of the present invention may be used to detect hard particles in uncooked chicken, meats, sea food and other bodies of various softer solid substances, whether a food or non-food product.

While we have shown and described a present preferred embodiment of this invention, it is to be distinctly understood that the invention is not limited thereto but may be otherwise variously embodied within the scope of the following claims.

We claim:

1. In an apparatus for detecting the presence of hard solid particles in a body of softer solid substance, a fluid pressure chamber with a group of closely-spaced probes extending therefrom, which probes are of uniform length with their exposed ends normally in a common plane and with their opposite ends terminating within said pressure chamber wherein there is a fluid pressure, whereby said opposite ends of all of the probes are yieldably restrained by the fluid pressure against relative movement when several or all of the probes of the group are projected into a mass of solid substance to be tested, and movement of one probe relative to another indicates the presence of harder and softer bodies in the mass with means for indicating any such relative movement, the invention wherein:
  a. the probes of said group are all carried by a common matrix with numerous holes therethrough forming one wall of the pressure chamber, one hole for each probe, and each probe has an intermediate portion slidably fitted in the hole in which it is received, the exposed end of the probe comprising a needle-like extension of the intermediate portion, and wherein
  b. common means is provided in the pressure chamber against which said opposite end of any probe will move to actuate indicating means when the pressure in the chamber is insufficient to keep the said probe extended against the resistance of a hard particle encountered by such probe as the goup of probes are projected into the substance to be tested.

2. The apparatus as set forth in claim 1, wherein said common means comprises an electrically conductive plate extending over and spaced above said opposite ends of all the the probes said spacing providing electrical isolation therebetween, said plate being free to move upwardly under the urging of any of the probe members.

3. The apparatus as set forth in claim 2, wherein said common matrix and said probes are electrically conductive and in electrical contact and are electrically connected to an indicating means electrical circuit, with said electrically conductive plate also being electrically connected to the indicating means circuit, which circuit is completed when any one or more of the said opposite ends of the probes contact said conductive plate to indicate the probe contacting a hard solid particle.

4. The apparatus as set forth in claim 1, wherein said opposite end of each probe is an enlarged terminal portion of greater diameter than the intermediate portion, said terminal portion being within the pressure chamber and normally seated against the matrix whereby its effective projected area exposed to pressure in the chamber is greater than the area of the hole in which the intermediate portion is fitted when said enlarged terminal portion of the probe is so seated.

5. The apparatus as set forth in claim 4, wherein a sealing means is arranged on the top of said common matrix with matrix apertures for the holes in the matrix, and the underside of each of the respective enlarged terminal portion of said probes seats when the pressure chamber is pressurized to seal said pressure chamber.

6. The apparatus as set forth in claim 1, wherein said common means is spaced above said opposite ends of said probes when the pressure chamber is pressurized by a distance slightly less than the minimum thickness of the hard particles sought to be detected.

7. The apparatus as set forth in claim 1, wherein said pressure chamber is reciprocably moveable from a position above the support platform for the mass to be tested to a position with the downwardly extending probe ends substantially penetrating the mass to be tested.

8. The apparatus as set forth in claim 7, wherein reversing means are included for effecting instant reversing of direction of the downwardly moving pressure chamber when the common means is engaged by upward movement of any one of said probes.

9. The apparatus as set forth in claim 7, wherein a stationary strippr plate having aligned probe receiving apertures is mounted between the reciprocably moveable pressure chamber and the support platform for the mass, whereby the mass is readily removed from the probes upon upward movement of the pressure chamber.

10. The apparatus as set forth in claim 1, wherein the holes of said common matrix are arranged in a spiral pattern radiating outward from the center of the common matrix with the holes being uniformly spaced along the spiral to provide a random array of probes.

11. In an apparatus for detecting the presence of hard solid particles in a body of softer substance, a fluid pressure chamber with a group of closely-spaced probes of uniform length with their exposed ends normally in a common plane and with their opposite ends terminating within the pressure chamber, wherein there is a fluid pressure, whereby said opposite ends of all of the probes are yieldably restrained by fluid pressure against relative movement when several or all of the probes of the group are projected into a mass of solid substance to be tested, and upon penetration of the probes into the soft solid substance termination of the movement of one probe with respect to the direction of continued penetration of the other probes indicates the pressure of a harder body within the softer body with electrical means for indicating any such relative probe movement, the invention wherein:
  a. the probes of said group are all carried by a common matrix with numerous holes therethrough forming one wall of the pressure chamber, one hole for each probe, and each probe has an intermediate portion slidably fitted in the hole in which it is received, the exposed end of the probe comprising a needle-like extension of the intermediate portion, the said opposite end of the probe being an enlarged terminal portion of greater diameter than the intermediate portion, said terminal portion being within the pressure chamber and normally seated against the matrix whereby its effective projected area exposed to pressure in the chamber is greater than the area of the hole in which the intermediate portion is fitted when said enlarge terminal portion of the probe is so seated, said common matrix and said probes being electrically conductive and in electrical contact with each other and electrically connected to an indicating means electrical circuit; and said combination wherein b. an electrically conductive plate extends over and is spaced above the terminal portions of all the probes, said spacing providing electrical isolation between the plate and the probes, said conductive plate also being electrically connected in the indicating means electrical circut so that the enlarged terminal portion of any probe will move upward to electrically contact said conductive plate and complete the indicating means electrical circuit when the pressure in the chamber is insufficient to keep the enlarged terminal portion normally seated on the matrix against the resistance of a hard solid particle encountered by the probe.

* * * * *